US007012611B2

(12) United States Patent
Anderson

(10) Patent No.: US 7,012,611 B2
(45) Date of Patent: Mar. 14, 2006

(54) SYSTEM, METHOD AND APPARATUS FOR PATTERN RECOGNITION WITH APPLICATION TO SYMBOL RECOGNITION AND REGENERATION FOR A CALLIGRAPHIC DISPLAY

(75) Inventor: Bruce Anderson, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/915,225

(22) Filed: Aug. 10, 2004

(65) Prior Publication Data

US 2005/0007376 A1    Jan. 13, 2005

Related U.S. Application Data

(60) Division of application No. 09/741,391, filed on Dec. 20, 2000, now Pat. No. 6,782,131, which is a continuation-in-part of application No. 09/474,667, filed on Dec. 29, 1999, now Pat. No. 6,671,406.

(51) Int. Cl.
G09G 5/399 (2006.01)
(52) U.S. Cl. ..................................... 345/539
(58) Field of Classification Search ................ 345/501, 345/539, 530, 536, 519, 531
See application file for complete search history.

(56) References Cited

U.S. PATENT DOCUMENTS 5,657,478 A * 8/1997 Recker et al. ............... 345/539
5,914,711 A * 6/1999 Mangerson et al. ......... 345/547
5,924,111 A * 7/1999 Huang et al. .................. 711/5
5,969,728 A * 10/1999 Dye et al. .................... 345/553

* cited by examiner

Primary Examiner—Kee M. Tung

(74) Attorney, Agent, or Firm—Kurt Luther; Dennis F. Armijo

(57) ABSTRACT

The invention provides a technique for pattern recognition that employs a state machine that incorporates a sequence of table-look-up operations. A sequence of input parameters, derived according to an application-specific algorithm, generates a corresponding sequence of memory addresses for these operations. The memory tables are organized in a hierarchical structure that corresponds to the input sequence. Table data is designed to recognize a specific library of input patterns. An input sequence traces an input-specific path through the memory tables until one of the patterns in the library is recognized or until it is determined that the input sequence is inconsistent with f the library patterns. For each library pattern, the table data is designed to accommodate the variations in the input values that are specific to the application (e.g., variations due to noise and/or tolerances). Table data can be derived by analysis, simulation, learning or a combination of these methods. The invention can replace neural networks or DSP correlation techniques in real-time applications. It achieves very high performance by comparing the input sequence to all of the patterns in the library simultaneously. The invention can be employed to improve the image quality of a caligraphic display system that uses flat-panel display technology. A method for improving the performance of display systems that employ image memories is also provided.

11 Claims, 3 Drawing Sheets

SYSTEM, METHOD AND APPARATUS FOR PATTERN RECOGNITION WITH APPLICATION TO SYMBOL RECOGNITION AND REGENERATION FOR A CALLIGRAPHIC DISPLAY

CROSS-REFERENCE TO RELATED APPLICATIONS

This is a divisional of U.S. patent application Ser. No. 09/741,391, filed on Dec. 20, 2000 now U.S. Pat. No. 6,782,131, entitled "System, Method and Apparatus For Pattern Recognition With Application to Symbol Recognition And Regeneration for a Calligraphic Display", which was a continuation-in-part of application Ser. No. 09/474,667, filed Dec. 29, 1999, now U.S. Pat. No. 6,671,406, entitled "System, Method and Apparatus for Pattern Recognition with Application to Symbol Recognition and Regeneration for a Calligraphic Display," the teachings of which are incorporated herein by reference.

BACKGROUND OF THE INVENTION

The present invention relates generally to the field of pattern recognition. More specifically, the present invention relates to a system, method and apparatus for pattern or symbol recognition usable in real-time applications.

There are a number of applications for, and approaches to, pattern recognition. For example, neural networks can be used for character recognition. But high-volume off-the-shelf semiconductor devices for neural networks are not available. Therefore, implementations that employ neural networks can be relatively expensive and they carry an inherent risk that the parts employed might become obsolete. Also, because of compromises that are typically made to neural network devices in order to lower their cost, they may not meet the performance requirements for some real-time applications. Similarly, Digital Signal Processors (DSP's) can also be used for pattern recognition (e.g., with correlation operations performed in either the time or the frequency domain). But DSP's can also be expensive and may not achieve the performance level required by some real-time applications. Thus, it would be useful to have an alternate approach to pattern recognition that can achieve high performance at a relatively low-cost without significant risk of parts obsolescence.

Many display systems employ cathode ray tubes (CRT's), but new CRT's are not always available to repair or replace these display systems. Therefore, a demand exists to replace these displays with newly designed display systems that utilize flat-panel display technology, such as liquid crystal display (LCD) technology. But the electrical interface to existing CRT-based displays is often incompatible with the requirements of LCD-based displays because of the differences between these two technologies. The primary incompatibility of these two technologies is in the way that the individual pixels of each display type are selected for illumination. LCD technology employs a mechanism for discretely selecting individual pixels, whereas CRT technology employs analog voltage signals to position one or more electron beams on the display surface.

Display processing systems for real-time applications, such as for avionics displays, generally incorporate a hardware vector generation (i.e., line drawing) capability. This hardware provides digital outputs for selecting X (horizontal) and Y (vertical) display screen locations, and digital video to specify the selected intensity and/or color. A separate video on/off output may also be provided. For a calligraphic/stroke type of CRT display, the X, Y, and video signals are converted to analog to directly control the position and intensity of the CRT electron beam(s). The symbol generator hardware then directly refreshes the display by executing its commands at a rate of approximately 60 HZ. For a dynamic display format, the command-list/program should be updated at a rate that is high enough to achieve smooth motion of the symbology. This may require an update rate of 20 or 30 HZ.

For LCD technology—or for a raster type of CRT-based display—the display screen is refreshed from a 2-dimensional frame buffer memory, or "image memory". An image memory can be an exact 2-D mapping of the pixels of the display screen, whereby each memory location holds a code that determines the color/intensity of its corresponding pixel. The digital X and Y outputs of the symbol generator are then used to address the 2-D image memory. Vectors are written/drawn into image memory instead of directly on the display screen. For real-time applications, a symbol generator is used to update the display format in one image memory while another image memory, which contains the previous update, is simultaneously used to refresh the display screen. Some CRT-based displays are designed to alternate between stroke and raster in a hybrid mode in order to overlay stroke symbology onto raster video.

Avionics display systems often employ separate physical units for the display function and the symbol generator/processor function. Stroke and hybrid CRT displays may utilize an analog interface between the symbol generator and the display unit. If such CRT-based displays are replaced with newer LCD-based units, it may be cost prohibitive to also replace the symbol generator. The new LCD-based display unit should then be designed to function with the existing analog interface. But because LCD technology employs a discrete type of pixel addressing mechanism, this tends to diminish the quality of the displayed symbology.

A conventional approach to the design of a LCD-based display unit with stroke-type analog inputs is to essentially mimic, or simulate, the operation of a CRT-based display. The analog X and Y deflection inputs are converted to digital and used to address a 2-D image memory where the digital/digitized video is written. Thus, the stroke inputs are used to write symbology into an image memory instead of directly onto a CRT display screen. This image memory is then subsequently scanned and read to provide the video for refreshing a LCD screen. While the digitized inputs are used to write into one image memory, a second memory (which stores the prior update) is used to refresh the display. With this design approach, the analog interface contributes errors/anomalies to the displayed image. These result from: 1) induced electromagnetic interference (EMI) on the analog X and Y signals—from external and internal sources; 2) wideband thermal noise generated within the analog circuitry; 3) phase noise in the sampling operation; and 4) quantization noise from the analog to digital (A-to-D) conversion.

All of these noise sources tend to degrade the quality of the displayed symbology. The severity of EMI depends on the individual application. A low-pass pre-filter is preferably employed before the sampling A-to-D conversion operation to prevent high-frequency EMI from aliasing into the bandwidth of interest, but lower frequency EMI will degrade the quality of the displayed symbology. Thermal noise causes small random deviations—that exhibit a Gaussian distribution around the norm—in the digitized samples of the analog deflection inputs. The effect of thermal noise can be minimized by oversampling the inputs (i.e., sampling at a higher rate than is required by downstream operations) and then employing a low-pass digital filter. Phase noise results from jitter in the sampling time, which can occur within the A-to-D converter circuit and also from jitter in the sampling clock. But in this application, a more significant error can result from an inconsistent phase of the sampling clock relative to the clock in the symbol generator (i.e., on different updates of the display format). The display anomalies that result from quantization noise can be minimized by employing a high resolution A-to-D converter (e.g., a 12-bit converter may provide a significantly higher resolution than the pixel resolution of the display).

Display anomalies can be categorized as either static or dynamic. A noise or distortion that is the same on every display update would be categorized as static. Its location would be fixed relative to either the display screen or to a symbol on the display screen (i.e., where the symbol itself might be in motion). An example of a static anomaly would be the distortions to individual symbols that result from aggressive low-pass filtering of the deflection inputs (e.g., resulting in symbols with severely rounded corners). A dynamic anomaly can be a noise or distortion that moves across the screen and/or through the symbology. It can also be located at a specific screen or specific symbol location and be exhibited on either a periodic or random basis. Since humans are adept at detecting motion/change, dynamic anomalies can be more objectionable than static ones. Increasing the amount of low-pass filtering can reduce the dynamic anomalies that result from EMI. However, this would increase the level of static distortion for the symbology.

Because this conventional design approach to a LCD-based caligraphic display with analog inputs results in objectionable display anomalies, it would be beneficial to employ some other design approach that does not have this problem.

BRIEF SUMMARY OF THE INVENTION

The following summary of the invention is provided to facilitate an understanding of some of the innovative features unique to the present invention, and is not intended to be a full description. Although the present invention has numerous applications, this summary will focus on the caligraphic display application. A full appreciation of the various aspects of the invention can be gained by taking the entire specification, claims, drawings, and abstract as a whole.

The present invention provides a pattern recognition solution that can be implemented using semiconductor memory devices. Memory chips are very high-volume commodity parts that are available at very low cost. Moreover, the density of memory chips (i.e., the number of bits in a single integrated circuit) has increased dramatically with advances in semiconductor technology, and will probably continue to do so. Thus, the invention provides a solution to the pattern recognition problem that achieves a very high level of performance at relatively low cost.

The present invention provides an alternate approach to the design of a LCD-based caligraphic display unit that improves the quality of the displayed symbology. In this alternate approach, the digitized samples of the analog deflection inputs, along with the video input(s), are monitored for the purpose of recognizing the individual symbols that are to be displayed. These symbols can then be regenerated within the display unit using completely digital means, thereby avoiding any degradation in the displayed symbology from the noise and the low-pass filtering at the analog interface. This approach requires a mechanism for reliably recognizing the individual display symbols from the analog deflection and video input(s) to the display unit, even when noise is present on these inputs. Since the symbol recognition function operates in real-time with the inputs to the display unit, the present invention is preferably implemented via hardware for this application, rather than via software. The need for real-time performance would also seem to require a solution that compares the display inputs on a simultaneous basis to the expected inputs for any one of the symbols in a symbol library (i.e., rather than a sequential comparison to one library symbol at a time). The subject invention is a low-cost solution to the symbol/pattern recognition problem that can meet the demanding requirements of this real-time application.

One embodiment of the present invention implements the pattern recognition function by means of a state machine that employs a sequence of table-look-up operations that are designed to recognize patterns in a sequence of inputs. The patterns that are to be recognized (i.e., the library of patterns) are used in deriving the data stored in the memory tables that are used by the table-look-up operations. The tables are organized in a hierarchical, or tree-like, structure having a unique set of memory tables for each level of this structure. The input to this pattern recognition mechanism comprises a time-sequence of memory addresses, which may be derived from the time-sampled and digitized values of one or more analog input signals. This would be the case for the application of a LCD-based calligraphic display unit having analog X and Y inputs. Other applications could derive this sequence of memory addresses by different means.

For the LCD-based calligraphic display, the X and Y input values are normally constant for some time period before the rendering of each display symbol (i.e., except for small changes due to noise). This was required by the older CRT-based display units to allow stabilization of their analog deflection amplifiers. This condition can be detected and used to reset the symbol recognition mechanism before a new display symbol is rendered. In addition, the digitized X and Y inputs can be filtered/averaged during this interval. These filtered values, which are saved, provide an accurate display-screen location for the symbol that is to be rendered.

Not all of the digitized X, Y, and video input samples are required to be used in generating the time-sequence of memory addresses for the symbol recognition mechanism. For example, one algorithm for generating these addresses uses all of the input samples in which the video input changes state and a selected number of the input samples in the intervals between these changes in the video input. For each of these samples, the associated memory address can then be derived by a concatenation of 1) a value representative of the video state just prior to the sample; 2) the relative value of the sampled X input; and 3) the relative value of the sampled Y input. Recall that the X and Y display-screen location prior to the rendering of a symbol is saved. A relative X position—for each of the X input samples—can then be derived by subtracting the saved X symbol position from the X value of the input sample. The relative Y values can be derived similarly. Accordingly, the selected input samples are then used to generate a corresponding time-sequence of memory addresses. This sequence of memory addresses is then used as the input to the symbol recognition operation.

The first memory address in the sequence is used to address a single memory table that resides at the first level in the hierarchy of memory tables. If the value of this address—and hence the values of the inputs for the sample that it represents—is consistent with the rendering of one or more of the symbols in the library, then the output from this address of the memory table points to a specific level-2 table that allows for the possible recognition of the consistent symbol(s). Then the next memory address in the sequence will be used to address this specified table at the second level in the hierarchy. As this process continues, the sequence of input samples—by means of their associated memory addresses—directs the path through the structure of memory tables until either a symbol is recognized or until it is determined that the input sequence is inconsistent with any of the library symbols.

Three types of outputs are possible for the memory tables. When a completed input sequence is unambiguously recognized as correlating to one of the symbols in the library, the code for that symbol is output from the memory. When an incomplete input sequence is—up to that point in the sequence—consistent with one or more of the library symbols, the memory output points to a specific table at the next level in the hierarchy that will test the next sample of the input sequence against this possibility. And when a given input sample, at any point in an input sequence, establishes that the input sequence is not consistent with any of the library symbols, the output of the memory table indicates this condition. When an input sequence is determined to be inconsistent with any library symbol, the digitized input samples can be used to directly render the symbol into the image memory (i.e., effectively bypassing the symbol regeneration mechanism). But to eliminate the possibility of generating dynamic display anomalies, the symbol recognition mechanism needs to reliably and consistently recognize all of the library symbols (i.e., even when noise is present on the inputs). This requires that the tables be designed to allow for the variations in the values of the input samples that can be encountered under the worst-case noise conditions.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The accompanying figures, in which like reference numerals refer to identical or functionally-similar elements throughout the separate views, and which are incorporated in and form part of the specification, further illustrate the present invention, and together with the detailed description of the invention, serve to explain the principles of the present invention.

DETAILED DESCRIPTION OF THE INVENTION

The present invention provides a system, method and apparatus for pattern recognition. Although the invention can be used in a number of applications, the following detailed description relates to a LCD-based caligraphic display unit with analog deflection inputs. By monitoring the analog deflection inputs, along with the video input(s), the symbology that is to be displayed can be recognized and then regenerated within the display unit by completely digital means. This eliminates anomalies and distortions in the symbology from noise and low-pass filtering at the analog inputs. Although the invention will be described relative to its use in this specific application, it should be understood that the present invention can be adapted for use in other applications that require pattern or symbol recognition.

For the caligraphic display application, digitized X and Y deflection values, along with video, are used to select a sequence of points on each of the rendered symbols. This sequence of points is then compared against the expected sequences of points for all of the symbols in a library that is stored in the display unit. If the input sequence is recognized as being a rendering of one of these symbols in the library, the stream of digitized input samples can be discarded and the symbol can be rendered from a list of vectors stored within the display unit. If an input sequence is not recognized as being one of the symbols in the internally stored library, the symbol can be directly rendered into image memory from the digitized input samples. This requires that the digitized input samples (deflection and video) be saved in a FIFO buffer in order to allow time for the symbol recognition operation. Symbols that are recognized as being in the symbol library are completely re-rendered with digital hardware within the display unit. Therefore, the quality of these displayed symbols is not degraded by noise or by the low-pass filtering at the analog interface.

Figure 1:
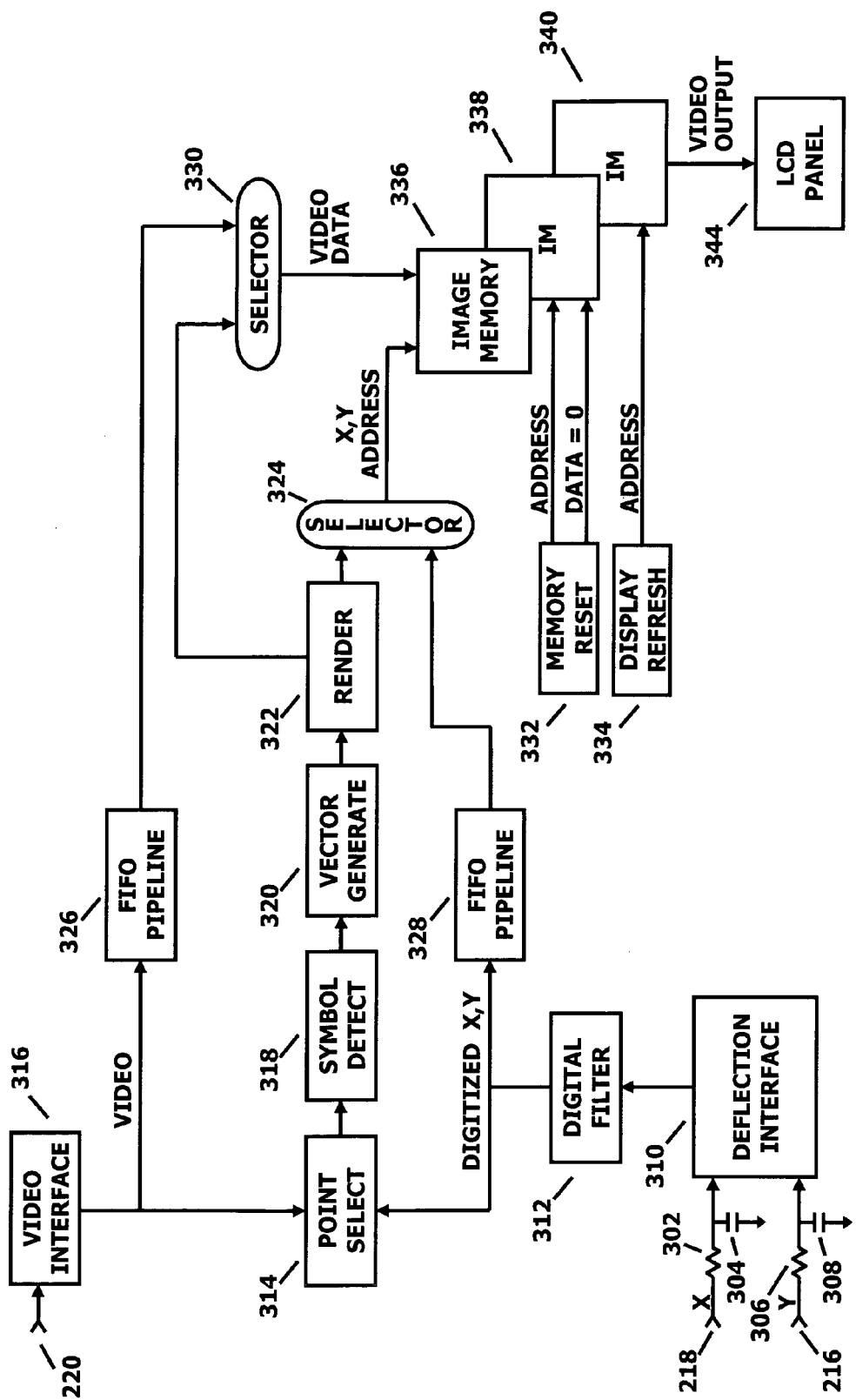
FIG. 1 shows a block diagram of a replacement system for older CRT-type calligraphic displays in accordance with the present invention.

FIG. 1 shows an embodiment of the present invention for the caligraphic display application. This display unit incorporates a flat-panel LCD 344, but it is designed to replace a CRT-based display unit that employs analog deflection inputs for selecting the horizontal and vertical display-screen positions. High frequency noise is removed from the horizontal, or X deflection, input signal 218 by means of a low pass filter comprised of a series resistor 302 and a parallel capacitor 304. A similar low pass filter with series resistor 306 and parallel capacitor 308 removes high frequency noise on the vertical, or Y deflection, input signal 216. The filtered inputs are sampled and converted into digital values on a periodic basis at the deflection interface 310. A high sampling rate (i.e., oversampling) is employed and the stream of sampled values is then processed by a low-pass digital filter 312.

The video input 220 may be comprised of multiple signals, and may be analog, digital, or a mix of both analog and digital. The video interface 316 detects the "off-to-on" and the "on-to-off" transitions of the video input 220. These transitions are used to synchronize and control the various operations within the display unit. The video interface 316 also compensates for any disparity in the timing of the video and the deflection inputs. Such a disparity may exist for an interface that was designed for a CRT-based display. The bandwidth for the deflection amplifiers of a CRT-based display is normally much lower than the bandwidth of the video circuitry. Consequently, the transitions of the video at the input to a CRT-based display are often delayed in order to synchronize with the deflection at the display screen. If this is the case, then the video interface 316 adjusts the video timing to effectively remove this compensation.

Instead of writing symbology directly onto the display screen, as with a stroke type of CRT-based display, the display shown in FIG. 1 writes the symbology into an image memory 336. An image memory is organized as a 2-dimensional array that corresponds—often on a one-to-one basis—with the array of pixels on the display screen. The input address to an image memory is thus comprised of a horizontal, or X, value and a vertical, or Y, value. For some implementations, each location in the memory would then store the video information for a single corresponding pixel of the display screen. This video information may include both the pixel intensity and the pixel color. A total of three image memories 336, 338, 340 are employed. While the symbology is being written into one of the image memories 336, the LCD 344 is refreshed by the video data, via display refresh 334 in another image memory 340 that holds the symbology that was written on the previous display refresh cycle 334. A third image memory 338 can be simultaneously cleared of symbology, via memory reset 332. so that it can be used to write updated symbology on the next refresh cycle. The functions of the image memories are then switched, on a rotating basis, at the start of each display refresh cycle 334.

Display systems have conventionally employed only two image memories, whereby, at any given time, one image memory is used to refresh the display while the second is being updated with new symbology. After the update operation is completed, the functions of these two image memories are interchanged. Some systems—but not all—synchronize this interchange to the completion of the display refresh operation. Following the interchange, the update operation first clears the image memory of the previously updated symbology/image and then writes the new symbology into the image memory. Because this clearing operation is performed time sequentially with the writing operation (i.e., instead of simultaneously) this limits system performance. Both the minimum latency time (i.e., the time delay for displaying updated symbology) and the maximum update rate are constrained by the requirement of performing these two operations sequentially.

By employing three image memories, the three image-memory operations (i.e., display refresh 334 clearing an image memory, via memory reset 332 of previous symbology, and writing new symbology) can all be performed simultaneously. This allows the display system to achieve a lower latency time and a higher update rate. It should be understood that this technique of utilizing three image memories to improve performance is not limited to the application of a LCD-based caligraphic display, lit can be employed in any display system that refreshes a display 334 with computer generated symbology/graphics from an image memory. It is intended that this feature of the present invention encompass all such display system applications.

In the display system of FIG. 1, two different mechanisms are employed for writing symbology into image memory. In one of these, the sampled and digitized X and Y input values are passed through a FIFO pipeline 328 and a selector 324 in order to supply address values to the image memory 336. The sampled video input is passed through a FIFO pipeline buffer 326 and a selector 330 in order to supply the video data input to the image memory 336. When the video data input is on (i.e., not in the off/blank state), it is written into the image memory 336 at the selected X/Y location. This approach emulates the operation of a CRT-based display, but the symbology is written into image memory instead of directly onto the display screen. However, the quality of the displayed symbology can be compromised with this approach as a result of noise on the analog deflection inputs 218 and 216.

The second mechanism for writing symbology into image memory eliminates the degradation to display quality that results from noise on the analog inputs. Instead of writing directly into the image memory, the data stream of sampled inputs is monitored to detect the specific symbols that are to be displayed. The detected symbols are then regenerated by digital means within the display unit. Therefore, they are rendered without the anomalies that can result from the analog interface.

The stream of digitized X and Y values, and the corresponding stream of video data, are first input to a point select mechanism 314. It is not necessary that every sample in the data stream (i.e., every point on a symbol) be processed in order to identify the symbol. Therefore, the point select mechanism 314 is used to reduce the amount of data that is input to the symbol detect mechanism 318. The point selection algorithm selects all of the samples/points in the data stream where a transition in the video occurs (e.g., where the video switches from off-to-on or from on-to-off). Additional points are selected when a relatively long interval occurs between the video transitions (e.g., the algorithm might select every fourth sample/point in the data stream during the interval between the video transitions). The number of points that are selected should be high enough to ensure an unambiguous detection of all of the symbols in a symbol library.

When a specific library symbol is detected, the vector generate mechanism 320 is used to regenerate the symbol from information in an internally stored library. It outputs a sequence of vector commands to the render mechanism 322. The render mechanism 322 then renders each of these vectors into image memory 336. It outputs a sequence of X/Y addresses through selector 324 to the address input of image memory 336 and it outputs video data through selector 330 to the data input of the image memory 336. Video data is written into the image memory at each of the addressed locations along the path of the vector. The vector commands for generating a given symbol designate the locations of the vector end-points as relative to the location of the symbol on the display. The points along the path of each vector are also initially generated as relative locations. Therefore, the rendering mechanism adds the symbol screen position to these relative values in order to generate the absolute X and Y addresses to the image memory.

When a symbol to be displayed is not recognized as being one of the symbols in the library, the data stream of X, Y, and video samples is used to render the symbol directly into image memory 336 through the FIFO pipeline buffers 326 and 328. The FIFO buffers 326 and 328 are required in order to save the stream of data samples during the time interval that is required for either identifying the symbol or determining that the symbol is not in the library.

Although not explicitly shown in the block diagram of FIG. 1, displays that are based on LCD technology generally require the implementation of an anti-aliasing function. Displayed images are actually spatially sampled representations of a desired image, and the quality of the displayed image can be degraded by an aliasing effect between the spatial resolution/frequency of the symbology and the pixel resolution of the display (i.e., the spatial sampling frequency). Aliasing is not a problem with a stroke CRT display because of the low-pass spatial filtering that is inherent with the analog-deflection mechanism of pixel addressing. However, LCD-based displays generally incorporate anti-aliasing circuitry in order to provide a high quality image. To this end, the analog-to-digital conversion of the X and Y input values employs a higher resolution than the pixel resolution of the LCD screen. Thus each of the X and Y values from the digital filter 312 shown in FIG. 1 has both integer and fractional bits. It is the integer portions of these values that are used to address the image memory 336, whereas the fractional bits represent subpixel addressing information that is used for anti-aliasing. One approach to anti-aliasing is to write the X and Y subpixel/fractional addressing information into the image memory 336 along with the video data. This information can then be processed when the image memory is scanned/read in order to implement an anti-aliasing algorithm on the video generated for the display refresh. A second approach is to implement the anti-aliasing function on the input-side of the image memory. This approach requires write operations to additional locations in the image memory 336. Locations that are adjacent or near to those traced by the integer X and Y values would be written with video of a lower intensity.

It should be recognized that the embodiment of the present invention shown in FIG. 1 is only a vehicle for describing the subject invention and it represents only a single example of this particular application of the invention. Some designs, for example, might include a capability for arcs as well as vectors in the re-rendering of detected symbols. Also, some display units are designed to allow computer-generated symbology to be overlaid on camera video.

The embodiment of the present invention shown in FIG. 1 allows symbols to be rendered from the internally stored library with very high quality. But it is equally important that the positions of these symbols on the display screen be stable over multiple display updates. An unstable symbol position would generate a dynamic display anomaly. Fortunately, the operation of a stroke display is compatible with the implementation of a special filtering operation that can accurately determine symbol position. When the symbol generator repositions the X and Y deflection to the initial/start position of a new symbol, it pauses before rendering the symbol so that the deflection amplifiers of a CRT-based stroke display unit have enough time to respond and settle to the correct output voltage. This time interval of stable X and Y input values (i.e., stable within the noise level) can be detected, and the input samples can be filtered during this time period to provide X and Y position values that are stable over multiple updates. For some stroke display systems, a string of alphanumeric symbols may be rendered with only a single pause (i.e., a pause preceding only the first symbol in the string). In this case, the display unit can be designed to position the additional symbols relative to the position of the first symbol in the string, thereby providing stable screen locations for all symbols in the string. The detection of this time period of stable X and Y deflection inputs prior to the rendering of a symbol can also be used to reset the symbol recognition mechanism, which operates as a state machine.

In order to eliminate the generation of dynamic anomalies, the symbol recognition mechanism should consistently recognize any symbol in the library under worst-case noise conditions. Additionally, it should not mistake some other input sequence for one of the symbols in the library. In other words, any input sequence (library symbol or non-library symbol) should not—even under worst-case noise conditions—reach a threshold level for the detection/recognition of one of the symbols in the library. Because the symbol recognition function is required to operate in real-time with the stream of digitized input samples, it may be necessary to implement this function in hardware rather than in software. The need for real-time performance would also seem to require a solution that compares the sequence of input points on a simultaneous basis to the expected sequences for all of the symbols in the library (i.e., rather than a sequential comparison to one library symbol at a time). The subject invention is a method of pattern recognition that is compatible with all of the above requirements.

Figure 2A:
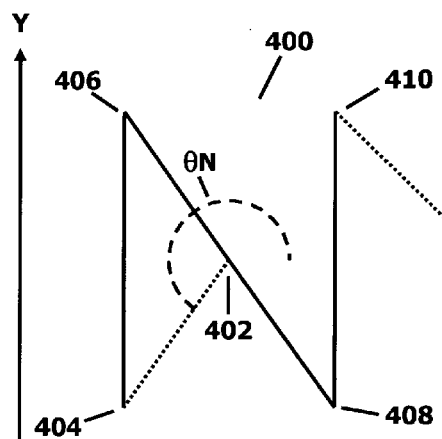
FIG. 2 shows an example of how the symbols "N" and "L" would be rendered without rotation and as they would be oriented in the memory tables to allow for the recognition of rotated symbology in accordance with the present invention.
Figure 2B:
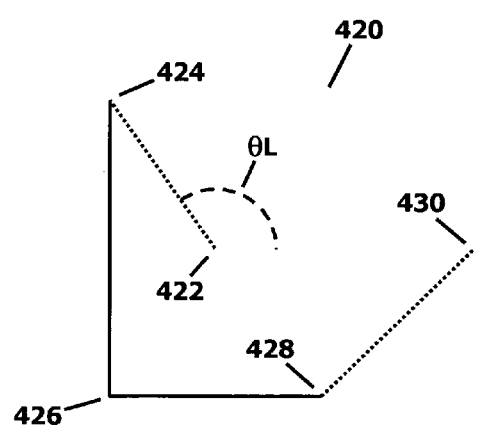
Figure 2C:
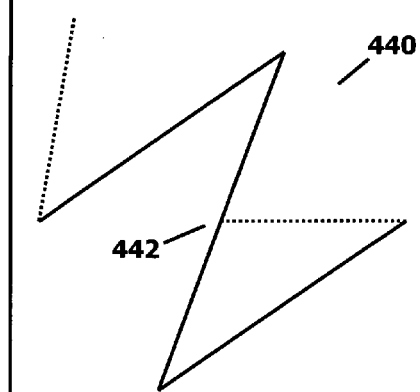
Figure 2D:
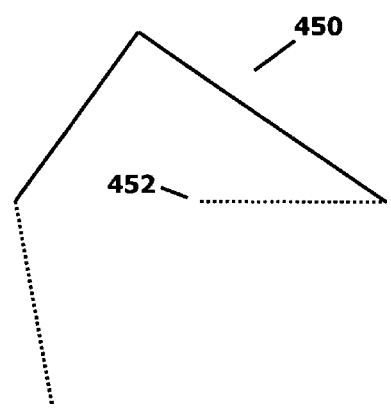
Figure 2:
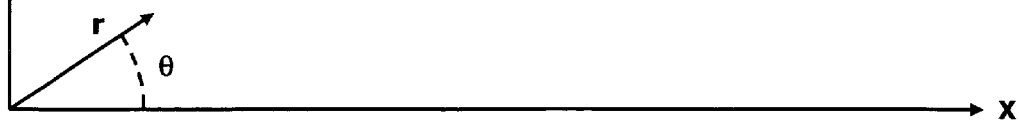

The pattern/symbol recognition mechanism will be explained by means of an example that shows the process for detecting the alphanumeric symbol "N". The first step in this process is to select samples from the input data stream that correspond to selected points on the symbol being rendered. These are used to generate a sequence of memory addresses that are used as the input to the symbol recognition mechanism. FIG. 2 depicts the rendering of two alphanumeric symbols for both the normal orientation of each symbol and also for a rotated orientation of each symbol. FIG. 2A shows the rendering of the symbol "N" 400 in its normal upright orientation and FIG. 2B shows the rendering of the symbol "L" 420 in the normal upright orientation. FIG. 2 also shows the superposition of two coordinate systems. The rectangular coordinate system is shown by the horizontal axis X and the vertical axis Y. Radial coordinate r and angular coordinate θ show the superimposed polar coordinate system.

The symbol "N" 400 of FIG. 2A is rendered by five vectors, and the reference numbers in FIG. 2A designate the end points of these vectors. Before the symbol "N" 400 is rendered, the X and Y deflection inputs to the display are stable—except for noise—at point 402 of FIG. 2A. As previously noted, this stable condition is detected in order to derive filtered X and Y values for point 402. The symbol recognition mechanism is also reset. The initial/starting point for rendering the symbol—which in this case is point 402—defines the symbol position. It is also used as the center of rotation when a symbol is rendered as rotated.

The symbol "N" 400 is rendered by first rendering a blank vector from point 402 of FIG. 2A to point 404. A "blank" vector is drawn with the video in the off state. This vector is shown as dotted in FIG. 2A in order to denote that the video is off. Three contiguous vectors, for which the video is switched on, follow this initial blank vector. Vectors are rendered from point 404 to point 406, from point 406 to point 408, and then from point 408 to point 410. Finally, another blank vector is rendered from point 410 to point 412. This latter vector is included for compatibility with the rendering of strings of alphanumeric characters—it positions the deflection to the next symbol position of a string. FIG. 2B shows a rendering of the symbol "L" 420. It is positioned at point 422, and is rendered by first rendering a blank vector from point 422 to point 424. This is followed by the rendering of two vectors with the video on. The vector rendered from point 424 to point 426 is followed by a vector from point 426 to point 428. This is followed by a blank vector from point 428 to 430, which positions the deflection for a subsequent symbol in a string.

Different algorithms can be employed to select the points on a rendered symbol for generating the inputs to the symbol recognition function. An effective technique is to first select all of the samples in the input stream on which a video transition occurs (i.e., a transition from off-to-on or on-to-off). This would result in the selection of points 404 and 410 on the rendered "N" 400 of FIG. 2A. If a pause occurs after the symbol is rendered, detection of this stable period of the sampled X and Y deflection can be used to select the ending point of the symbol (i.e., point 412 of FIG. 2A). Additional points are then selected between these initially selected points. A simple and effective algorithm is to select additional points on a periodic basis. For example, every fourth sample following a video transition might be selected. But other algorithms are possible. One possibility is to select the vertex points between contiguous vectors. This would result in the selection of points 406 and 408 in FIG. 2A. An algorithm could also be devised for using a combination of vertex selection and the periodic selection of points.

The vertices between the vectors of FIG. 2A can be detected by monitoring the changes in the sampled X and Y input values over time (i.e., by monitoring the $\Delta X/\Delta t$ and the $\Delta Y/\Delta t$ values). These values are essentially constant—except for noise and the limited resolution of the A-to-D conversion—during the rendering of a given vector. But these "velocity values" reflect the orientation of the rendered vector. A change in one or both of these values can be used to detect the location of a vertex/corner between two vectors, and hence to select the additional points on the rendered symbol.

Each vertex in the symbol "N" 400 is formed by a pair of vectors with significantly different orientations. This simplifies the detection of these vertices. A vertex for two vectors with similar orientations is more difficult to detect and can result in a less consistent selection of points on multiple renderings of the same symbol. This is especially true when noise is present. Therefore, in a practical implementation of this invention, the periodic approach to the selection of additional points may be preferred. However, in the interest of simplicity, the vertex selection algorithm will be used in this example. With this algorithm, the points 404, 406, 408, 410 and 412 would be selected on the rendered "N" 400 of FIG. 2A.

The next step in the symbol recognition process is to generate a sequence of memory addresses. A single memory address is derived from each of the selected points. The symbol recognition process then uses this sequence of address inputs for a sequence of table-look-up operations. The memory tables for these operations are organized in a hierarchy of levels with one or more tables at each level of this structure and with a separate level for each of the memory addresses of an input sequence. The first address of an input sequence is used to address a memory table at the first level of this structure. If the location of the first selected point on the rendered symbol is consistent with one or more symbols of the library, then the output of the addressed memory table will point to a specific table at level-2 of the structure that allows for this possibility. Then the second address in the input sequence is used to address this specified table at level-2 of the structure. This process continues with the selected points on the rendered symbol—by means of the corresponding memory addresses—directing the path through the hierarchy of memory tables.

At least three types of outputs are possible for the memory tables. As long as the sequence of points/addresses remains consistent with one or more of the symbols in the library, each memory table outputs a "table address" that points to a specific table at the next level in the hierarchy. Then the next address in the input sequence is used to address this specified table in order to test the corresponding point on the rendered symbol. Should this point be inconsistent with any of the possible library symbols, the memory table output indicates this failure to recognize the rendered symbol. But if a completed sequence of memory addresses is consistent with one of the library symbols, the output from the last memory table is the code for the rendered symbol. The symbol can then be re-rendered by the display unit.

For each selected point on a rendered symbol, the corresponding memory address is comprised of the relative X value of the point, the relative Y value of the point, and a single video bit. For the symbol "N" 400 of FIG. 2A, the relative X value of a given point is derived by subtracting the X value of point 402 from the X value at the given point. The relative Y value of the given point is derived by subtracting the Y value of point 402 from the Y value at the given point. The single video bit in the memory address denotes whether or not the video is "on" (i.e., in a non-blank state) prior to the time that the given point is sampled. The complete video information for a rendered symbol (i.e., the intensity and/or color of the rendered symbol) is required for correctly re-rendering the symbol, but only the video "on-off" state is required to recognize the symbol.

Figure 3:
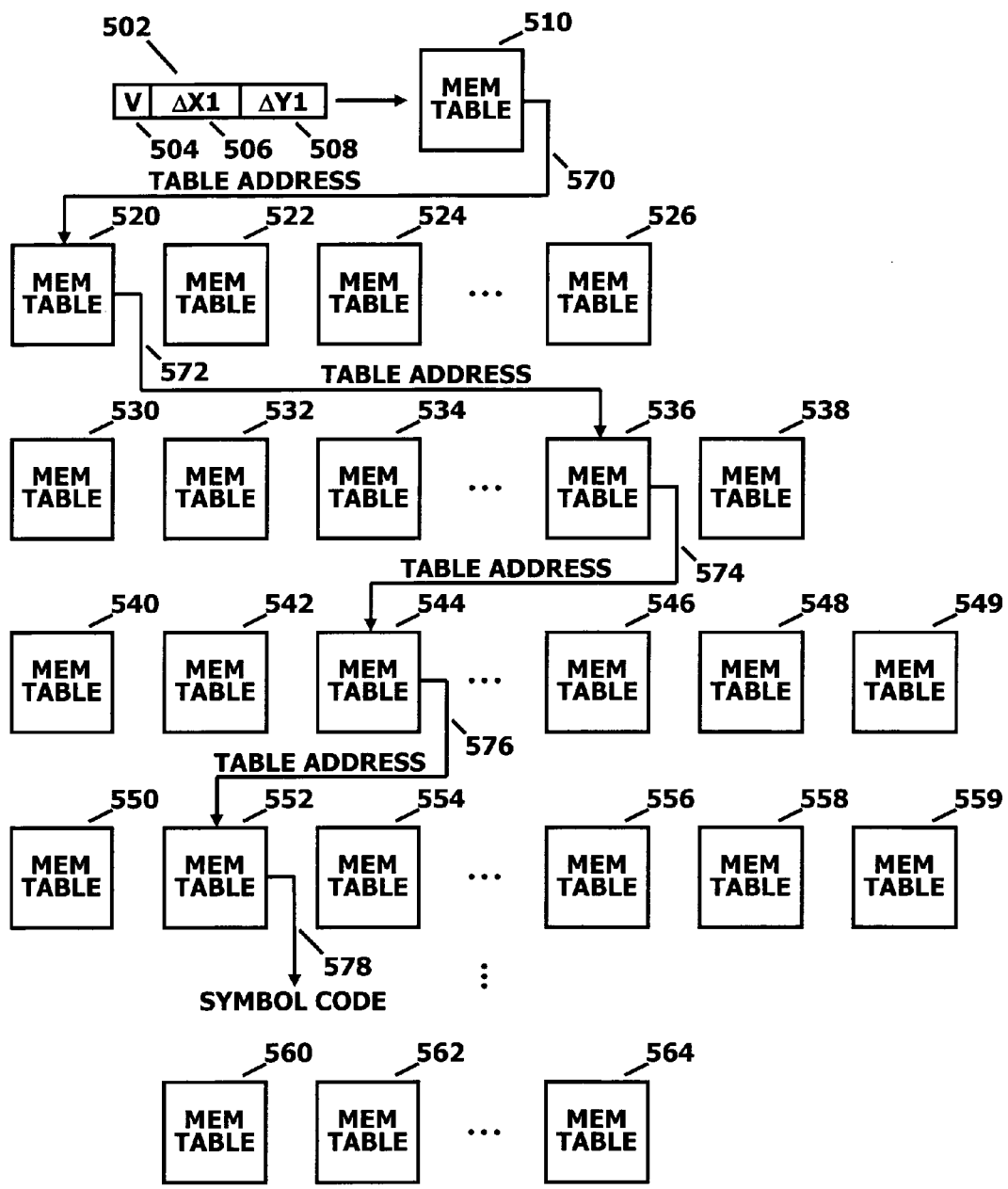
FIG. 3 is a diagram that shows an example of the operation of the symbol recognition mechanism in accordance with the present invention.

The symbol recognition process for the symbol "N" 400 of FIG. 2A is diagrammed in FIG. 3. The address 502 of FIG. 3 is derived from point 404 of FIG. 2A. Address 502 is comprised of both the relative X location $\Delta X1$ 506 and the relative Y location $\Delta Y1$ 508, of point 404, and of the single video bit V 504. The state of the video bit V 504 reflects that the video is blank prior to the sampled point 404. Address 502 is used for the first table-look-up operation in the symbol recognition process. It determines the output from the memory table 510 of FIG. 3. The first level in the structure of memory tables of FIG. 3 is comprised of this single memory table, 510. Level-2 of this structure is comprised of the tables 520, 522, 524, 526, and perhaps additional tables that are not explicitly shown in FIG. 3. Level-3 is comprised of tables 530, 532, 534, 536, 538, and perhaps additional tables that are not explicitly shown. Similarly, level-4 is comprised of tables 540, 542, 544, 546, 548, 549, and perhaps additional tables. Level-5 is comprised of tables 550, 552, 554, 556, 558, 559, and perhaps additional tables. The last level in this structure, which can be designated as the "Nth" level, is comprised of the tables 560, 562, 564, and possibly additional tables. This structure of memory tables may include additional levels, not explicitly shown in FIG. 3, that reside between level-5 and the last level.

The symbol recognition operation for the symbol "N" 400 of FIG. 2A employs a sequence of five addresses that are derived consecutively from the points 404, 406, 408, 410, and 412 of FIG. 2A. Each of these addresses is used for a table-look-up operation at the corresponding level in the memory structure of FIG. 3. Only the first address in this sequence (i.e., the address 502 derived from point 404) is explicitly shown in FIG. 3. Both the location of point 404 (relative to point 402) and the blank video-state preceding point 404, are consistent with the rendering of a number of possible symbols. These include any of the symbols: A, B, D, F, H, K, M, N, P, R, and X. Therefore, in response to the input address 502, memory table 510 is designed to output a pointer 570 to the level-2 table 520, which is designed to allow for the possibility of any of these symbols. The next address in the sequence, which is derived from point 406, is then used for a table-look-up operation with table 520. The location of point 406 is not consistent with the rendering of the symbols "A" or "X". Therefore, the output 572 of table 520 points to the level-3 table 536, which is designed to allow for only the symbols that remain consistent with both of the points 404 and 406. These comprise the symbols: B, D, F, H, K, M, N, P, and R. The address derived from point 408 is then used for a table-look-up operation on memory table 536. But point 408 is not consistent with the rendering of any of the symbols: B, D, F, H, K, M, P, and R. Only the symbol "N" remains as a possibility. Therefore, the output 574 of table 536 points to the level-4 table 544, which is designed to test point 410 against this last possibility. Point 410 is indeed consistent with the symbol "N". Thus, in response to the address derived from point 410, the output 576 of table 544 points to the level-5 table 552, which is designed to test point 412 for consistency with the symbol "N". Since this is the case, table 552 outputs the code 578 for the symbol "N" to indicate that this symbol was recognized. If the location of point 412 is inconsistent with the rendering of the symbol "N" 400, table 552 outputs a code to indicate that the rendered symbol is inconsistent with any of the symbols in the library.

The content of the memory tables is designed to recognize any of the symbols in a symbol library. For some applications, the sequence of memory addresses for each symbol of the library may trace a single unique path through the structure of memory tables. But this will not always be the case. Consider the following example. For some particular application, the location of a selected point on a rendered symbol might be consistent with two different library symbols, say symbol "S1" and symbol "S2". However, if this point were at a slightly different location—perhaps due to noise, it might be consistent with symbol "S1", but not with the symbol "S2". In this case, the next level of the structure would include two memory tables that allow for the possible recognition of the symbol "S1". One of these would allow for both "S1" and "S2", and the other would allow for only "S1". Then for this application, at least two paths exist through the structure of memory tables that result in the recognition of the symbol "S1".

This described method of pattern recognition has some similarities to the neural network approach. For example, both of these approaches compare the sequence of inputs on a simultaneous basis to all of the patterns of a library (i.e., rather than comparing on a time-sequential basis to one library pattern at a time). However, for both hardware and software implementations, the subject invention can achieve a higher level of performance. In the case of hardware implementations, the subject invention generally provides a lower-cost solution than the neural network approach. And because it can employ standard off-the-shelf memory devices, it also avoids the risk of future parts obsolescence that is inherent with the neural network approach. As with the neural network approach, the subject invention can also employ a learning method for tailoring a basic design to a specific application.

The data in the memory tables of the subject invention can be derived by analysis, by simulation, by a learning approach, or by a combination of these techniques. For the learning approach, data can be collected from the actual rendering of the library symbols (e.g., at the output of the point select function 314 in the block diagram of FIG. 1). If this data is collected in the actual real-world environment of the end product, it will reflect the actual noise conditions of this environment. It can then be analyzed—by means of an automated process using a computer program—to determine both the nominal values for the selected points on each rendered symbol and also the standard deviation for these values in the actual noise environment. Standard statistical methods can then be employed in the generation of the table data. For example, this data can be generated for a specific error probability in the symbol recognition function. This approach to deriving the table data provides a significant advantage over the strictly empirical approach to learning inherent with neural networks. With a neural network solution, noise margins and error probabilities are known only empirically and much less confidently.

The amount of memory required for a specific application of the invention is not easily determined. For example, the number of memory tables required for a given level of the structure is application-dependent but generally increases with the number of symbols (or patterns) in the library. For the described application, the number of levels in the memory structure is determined by the maximum number of points/samples that will be selected for the rendering of any symbol in the library. But for most symbols, the number of points selected will be less than this maximum. Therefore, most library symbols will not utilize all the levels of the structure. The number of points selected on rendered symbols should be large enough for unambiguous symbol recognition, but the selection of additional/redundant points unnecessarily increases memory size. Given this complexity, it is still useful to examine the potential memory requirements of the invention.

Consider the memory required for a design with a library of 128 symbols and a maximum of 33 points selected on the rendered symbols. The memory structure would then comprise 33 levels with the first level comprised of a single table. For the remaining 32 levels, a reasonable upper bound for the "average" number of tables might be 64, which is one-half the number of symbols. Because of the similarity of many symbols, initial levels of the structure require relatively few tables. And because most rendered symbols have less than the maximum number of selected points, levels toward the end of the structure also have relatively few tables. For any level, the number of tables would generally be somewhat less than 128, which is the total number of library symbols. Therefore, an average of 64 tables in each of 32 levels (i.e., a total of 2048 tables) may represent an upper bound to the actual memory requirement. Assuming 6 bits each for the $\Delta X$ and $\Delta Y$ values, and allowing for the single video-bit, gives a 13-bit address, which requires 8192 words per memory table. (With 6-bits for $\Delta X$ and $\Delta Y$, relatively large alphanumeric symbols can be accommodated.)

An output word of 8-bits/1-byte may prove sufficient for the memory tables. A single bit in this output can specify the remaining 7 bits to be either a 7-bit symbol-code—to indicate recognition of the coded symbol—or a 7-bit "table-address-code". If each level is limited to a maximum of 127 tables, the 7-bit table-address-code is sufficient to either select one of the tables of the next level or to indicate a failure to recognize the rendered symbol. (The level number is also employed in this overall memory-addressing scheme.) A total of 128 Mbits of memory is then required (i.e., 32 levels•64 tables•8192 words•8 bits=128 Mbits). With current technology, this memory can be implemented with a single FLASH-type memory chip.

Some applications require that large full-screen symbology be displayed. If the present invention is employed to recognize and re-render only small alpha-numeric symbols, larger symbols would be written directly into image memory without being re-rendered. But the subject invention can also be adapted to recognize full-screen symbology. One approach to make this practical is to scale the $\Delta X$ and $\Delta Y$ values that are used in the memory addresses to a lower resolution—otherwise the size of the memory tables would become prohibitively large. For some applications these values might be scaled to ⅛ or to ¹⁄₁₆ of the pixel resolution of the display screen. The same scale factor—or a similar factor—would also be applied to the frequency of point selection on the rendered symbols. For a system designed to recognize and re-render both full-screen symbols and smaller alphanumeric symbols, two independent circuits can be employed for symbol recognition. These can operate in parallel, with one circuit used to recognize alphanumeric symbology and the other used to recognize large symbology. An alternate approach for handling large symbols is to modify the algorithm used in calculating the ΔX and ΔY values that are used in the memory addresses. In this approach, only the first selected point on the rendered symbol is referenced to the symbol start position. For the remaining points, the ΔX and ΔY values are referenced to the location of the previously selected point in the sequence. This alternate approach has the advantage of employing a higher resolution to the recognition of large symbols. Although it could also be used for smaller symbology, it may be advantageous to employ independent symbol recognition mechanisms for small and large symbols because a lower frequency of point selection would normally be used for large symbology. Some applications display only a limited set of specific display formats that incorporate a mix of large and small symbols. In these applications, two symbol recognition circuits can be used in conjunction to identify specific display formats by the mix and/or sequencing of rendered symbols.

Many systems can display multiple sizes of a basic set of alphanumeric symbols. The symbol recognition mechanism can treat each size of a given symbol as a completely different symbol. The total of 128 different symbols in the prior example may allow two or three different sizes of a basic set of symbols to be recognized. This approach may be the most cost-effect method of handling multiple-sized symbology. However, if the symbol recognition mechanism is fast enough to process multiple data streams on a time-shared basis, another approach to recognizing multiple symbol sizes is possible. The memory tables can be designed to recognize "normal size" symbols via the primary stream of memory addresses. Additional data streams can be then be generated for each alternate symbol size by scaling the ΔX and ΔY values from the alternate size to the "normal size". The symbol recognition mechanism would then be used on a time-shared basis by all of these data streams. The actual size of a recognized symbol can then be determined from the scale factor of the particular data stream. An alternate approach allows the recognition of multiple sized symbols from only a single data stream. In this approach, a specific point on each rendered symbol (e.g., the point at the first video transition) is scaled to a fixed value and the same scale factor is then applied to all of the selected points on the rendered symbol. (To simplify this approach, the scale factor might be derived by scaling the larger of either ΔX or ΔY to the fixed value.) Each library symbol is then stored in the tables with a symbol-specific scale factor that is consistent with the scaling algorithm used on the rendered points. The actual size of a recognized symbol can then be derived from the table scale factor and the scale factor that was applied to the rendered points.

The invention can also be employed to recognize rotated symbols. For optimum real-time performance, the symbol recognition mechanism should then be designed to not only test the sequence of input points against all library symbols on a simultaneous basis, but to also recognize these symbols at any possible orientation. If rotated versions of library symbols were included in the memory tables, this would significantly increase memory size. But a modification to the symbol recognition mechanism depicted in FIG. 3 allows the recognition of rotated symbols without increasing memory. In this modified approach, the selected points on the rendered symbol are defined by their polar coordinates. The ΔX and ΔY values for a given point can be converted into the equivalent polar coordinate values (r and θ) by a table-look-up operation. For the prior example, ΔX and ΔY are both 6-bit signed values. These can be converted into a 5-bit magnitude value for r and a 7-bit angular value for θ. As with the ΔX and ΔY values, these polar coordinate values can be relative to the symbol position. Then for the symbol "N" 400 of FIG. 2A they are referenced to point 402, and for the symbol "L" 420 of FIG. 2B they are referenced to point 422. The memory addresses used for symbol recognition are then comprised of the single-bit video value, an r value, and a θ value. The data stored in the memory tables—reflective of the library symbols—is then in accordance with the polar coordinate system.

The algorithm for handling rotation requires that the θ values in the sequence of memory addresses be modified from the θ values of the corresponding points on the rendered symbol by the subtraction of a "rendered-offset-angle". Because of this offset angle, the rendered symbol is effectively rotated before it is input to the symbol recognition mechanism. The angle of the first selected point on a rendered symbol is saved and used for the value of the rendered-offset-angle. Therefore, regardless of its actual orientation, a rendered library symbol will always be presented to the symbol recognition mechanism at the same orientation (i.e., with the angle of the first selected point equal to "0"). Thus, the memory tables need only store a single orientation of each library symbol—where the orientation of a given symbol in the memory tables can be unique to that particular symbol. (Note that the single memory table at level 1 of the structure could then be smaller than the other tables since the angle bits in this memory address will always be "0".) The normal, or non-rotated, orientation for any given symbol of the library is defined herein as corresponding to a rotation angle equal to "0". FIG. 2A shows a rendering of the symbol "N" 400 at position 402 for its normal orientation (i.e., at a rotation angle equal to "0"). The angle of the first selected point on this symbol (i.e., point 404) is shown as the angle θN. FIG. 2C shows a rendering of the symbol "N" 440 at position 442 with an orientation of −θN. This is the orientation of the symbol "N" that is stored in the memory tables and that is presented at the input to the symbol recognition mechanism. FIG. 2B shows the symbol "L" 420 rendered at position 422 in its non-rotated orientation. The first selected point on the symbol "L" 420 (i.e., point 424) has the angle θL. FIG. 2D shows the symbol "L" 450 rendered at the point 452 with the orientation −θL. This is the orientation of the symbol "L" in the memory tables and the orientation presented to the input of the symbol recognition mechanism. In this manner, each library symbol is stored in the memory tables with a "table-offset-angle" that is specific to the symbol and that corresponds to an orientation that gives an angle of "0" for the first selected point on the rendered symbol. (The table-offset-angle for the symbol "N" is equal to −θN, and the table-offset-angle for the symbol "L" is equal to −θL.) When a symbol is recognized, the actual orientation of the rendered symbol is given by the sum of the rendered-offset-angle and the table-offset-angle. The symbol can then be re-rendered at this orientation.

Recall that during the time period of relatively stable X and Y deflection prior to the rendering of a symbol, the sampled X and Y values are filtered in order to derive the symbol position. This provides a stable/consistent symbol position over multiple display updates, thereby preventing a dynamic display anomaly. To avoid a dynamic anomaly for a rotated symbol, it is also necessary to derive an accurate rotation angle that is stable over multiple updates. The above approach for recognizing rotated symbology relies on only two symbol points to derive the symbol orientation. Even if the first of these points—the symbol position—is known to be accurate, the coordinates of the second point (e.g., point 404 on the symbol "N" 400 of FIG. 2A) are subject to noise. Therefore, the derived rotation angle—although adequate for symbol recognition—may not be stable enough over multiple updates to avoid a dynamic display anomaly. However, all of the digitized X and Y inputs to the point select mechanism 314 in FIG. 1 are saved in the FIFO pipeline buffer 328. They are saved to allow for a direct rendering into image memory when a symbol is not recognized as being one of the symbols of the library. Some of these points on the rendered symbol can be used in a post-processing operation (i.e., after a symbol has been recognized) to derive a more accurate orientation angle for the rendered symbol. Multiple points, which can be symbol-specific points in the sampling sequence, can be used to provide multiple computations of the symbol orientation angle. The expected angle of a given point—for a non-rotated rendering of the symbol—is subtracted from the actual angle of the sampled point. These multiple samples of the symbol orientation can then be averaged to provide a more accurate orientation angle.

Some display formats employ the same rotation angle for both large and small symbology (e.g., this is true of some real-time avionics display formats), and the value of this rotation angle can be derived more accurately from the larger symbology. As previously noted, it is possible to identify a display-format from the mix and/or sequence of the rendered symbology. In such cases, the value of the rotation angle that is derived from the larger symbology can be applied to the re-rendering of the smaller symbology.

It should be recognized that this example application of the invention is used as a vehicle for describing the invention and is not intended to be limiting. Even within this application, variations in the implementation and use of the invention are possible. For example, the approach for recognizing rotated symbols can be used with the approaches for recognizing multiple symbol sizes and/or with the approaches for recognizing large full-screen symbology. Also, it is not necessary to re-render recognized symbols in the same way that they are originally rendered. For example, they could be rendered in a different size or in a different style font. It is also possible to implement a "symbol substitution" whereby a recognized symbol is re-rendered as a completely different symbol.

The invention can also be used for the classical problem of character recognition, in which characters are already rendered in 2-Dimensional space (e.g., where characters have been rendered from a raster video signal). Such characters can be defined by means of a 2-D bitmap employing a single bit of video. The memory address inputs to the symbol recognition mechanism could then be generated directly from this bitmap (e.g., with the top row of the bitmap used for the address at level-1, the second row used for the level-2 address, and etc.). For relatively large bitmaps, two or more memory address inputs could be derived from each row of the bitmap in order to reduce the required size of each memory table. Of course, the bitmap could be preprocessed prior to this operation by normalizing the character size (i.e., scaling in X and Y) and by rotation to either select for horizontal or vertical lines or to maximize vertical and/or horizontal symmetry.

Many systems require the recognition of patterns in a continuous real-time stream of sampled data parameters. The data samples can be converted into—or used directly for—a corresponding stream of memory addresses for input to the pattern recognition mechanism. The continuous stream of memory addresses is then used to compare the sequence of real-time inputs against a set of finite sequences that comprise a set of library patterns. The data stored in the structure of memory tables is derived from the set of library patterns. (The set of library patterns can comprise sequences of different length—in terms of the number of samples in a pattern. The number of levels in the structure of memory tables corresponds to the number of samples in the longest library pattern.) In many such applications, it is not possible to identify (in advance) the specific locations within the input data stream that may coincide with the start of a library pattern. Therefore, the symbol recognition mechanism cannot be synchronized to the beginning of a possible datastream pattern via a reset operation. It is then possible for a given memory address from the input data stream to align with any position in the sequence of a library pattern (e.g., including the first position, which corresponds to the first level in the structure of memory tables). And since each level in the memory structure is associated with a corresponding sample position in the library patterns, this requires that each memory address input be tested—by means of a table-look-up operation—at every level of the memory structure. It is possible, with a hardware embodiment of the invention, to perform table-look-up operations for each memory address input at every level of the memory structure on a simultaneous basis. Thus, no performance penalty need result from the inability to discern, in advance, the beginning locations of patterns in the input data stream.

Consider a hardware implementation of the invention with separate independent memories at each level of the memory structure. It is then possible to access all of these memories simultaneously (e.g., on every cycle of a controlling clock signal). The address input to each of these memories is comprised of two parts. One part is provided by the stream of memory address inputs to the symbol recognition circuitry (i.e., with the current memory address input supplied to all of the memories). This part of the address is used to select the specific entry within a selected table. The second part of each address is used to select a specific table within each memory. The table address to each memory/level is provided by the output of the previous clock cycle from the memory at the next higher level in the structure (except that level-1 of the structure may have only a single memory table).

Now consider the operation of this pattern recognition circuit beginning with the clock cycle hereby designated as cycle "i". During this clock cycle, the memory address input—which corresponds to sample "i" of the real-time input parameter(s)—is used for table-look-up operations at each memory/level. The table-look-up operation at level 1 is used to test input sample "i" for consistency with the very first sample in the sequence of each one of the stored library patterns. If this input is consistent with one or more of the library patterns—based only on the first sample in the patterns—the memory table at level 1 outputs a table-address that selects a specific level-2 table that allows for such possibility. Then, on the next clock cycle, input address "i+1" is used for a table-look-up operation on this specified table of level 2. (It is used for table-look-up operations at the other levels, as well. For example, it is used at level 1 to test input sample "i+1" for a possible match to the first sample of each of the library patterns. But we are only concerned here with possible pattern matches that begin with input sample "i".) This table-look-up at level 2 tests input sample "i+1" against the second samples in each of the sequences of the library patterns that remain as possible matches (i.e., given sample "i" as the first sample in the sequence). If this test determines that one or more library patterns remain as possible matches to this sequence of two input samples, the output of the level-2 table will be a table address that selects a level-3 table that allows for this possibility. On the next clock cycle, the memory address for input sample "i+2" is used for a table-look-up operation on this specified level-3 table in order to test the third sequential input sample against the third sample in the sequence of each of the library patterns that remain as possible matches. This process continues, advancing one step down the structure of memory tables with each clock cycle. If at some given clock cycle, and some corresponding level of the memory structure, the input sample is not consistent with the remaining library pattern(s), this is indicated by the output of the memory table. Then the sequence of input samples that begins with sample "i" does not match any of the patterns in the library. But if the process continues down the structure of tables to the last sample of a library pattern, and if the corresponding input sample is found to match this last sample in the library pattern, then the memory output will indicate that the input sequence (beginning with sample "i") matches this library pattern.

From the above, it is seen that a new compare operation is started on every single clock cycle, where this compare operation is based on the possibility of the new input being the first sample in a sequence that matches one of the library patterns. Once started, each of these compare operations continues on subsequent clock cycles until it is retired because either a match is found or it is determined that the sequence does not match any of the library patterns. It should be understood that specific applications might require different embodiments of this basic circuit. For example, if the input memory addresses are modified by a preprocessing operation that uses a value from some parameter at the start of a possible pattern (e.g., modified by scaling or rotation) then a different preprocessing value is required at each level of the structure. (This results from the fact that, on a given clock cycle, each level of the structure tests for data patterns at different starting positions in the input data stream.) Then each level/memory in the circuit would require independent hardware for preprocessing the input memory address.

The pattern recognition circuit described above, or a part of this circuit, could be implemented as a single integrated circuit device. This device would then include the independent memories for each level of the structure and the addressing means for these memories (i.e., including the routing of the table addresses through the memory structure). Such a device could be designed to allow some reconfiguration of the memory structure in regard to the size of the memory tables and the allocation of the available memory relative to the memory at each level and the total number of levels. It could also be designed to accommodate expansion in order to allow systems to be configured from multiple such devices.

Some applications can benefit from the use of RAM in the memory tables, as this would allow the downloading of new table data, reflective of new sets of library patterns. For example, this would allow noise margins to be altered in real-time by an adaptive system. This can be facilitated by including additional information in the output from the memory tables. For example, an additional output bit could be used to indicate whether a pattern was recognized within or outside of some noise margin. (In regard to implementation, this could be viewed as equivalent to a simple doubling of the number of patterns/symbols in the library.) The tables could also be designed to output probability values to allow a confidence factor to be generated for each recognized pattern/symbol. Of course, these techniques can also be of value for non-adaptive systems (e.g., they can be used for system self-monitoring and failure detection/prediction). Some adaptive systems could also make use of the learning method for deriving the table data. Also, if multiple pattern-recognition circuits are used in a system, new table-data can be loaded into one of these circuits while another remains on-line.

The invention has been shown to have very broad application to the general problem of pattern recognition, and it can be employed in many different applications. It could be used in place of neural networks or in place of DSP correlation techniques to improve real-time performance and/or to reduce cost. The number of input parameters and the methods and algorithms for any preprocessing of the input data and for generating the sequence of memory-address inputs would generally be application-specific. Preprocessing could include DSP operations, such as the Discrete Fast Fourier Transform (DFFT). As demonstrated, judicious preprocessing of the input data (e.g., by scaling/normalizing and/or by coordinate transformation and rotation) can be used to minimize the size and/or number of the required memory tables. These preprocessing techniques can also be used in applications that require the recognition of patterns in 3-dimensional space or the recognition of the projections of 3-D objects onto a 2-D plane. If an application has parameters that are mutually independent—or can be made independent by preprocessing—then independent pattern recognition mechanisms can be implemented for the independent parameters. The outputs from these mechanisms can then be correlated. This approach can significantly reduce the total memory size over the approach of including all of the parameter values in a single memory address.

In addition to symbol and character recognition, other applications of the invention include speech recognition, threat detection and identification, automated manufacturing and test systems, and vision/image processing systems (e.g., for robotic pick-and-place machines used in manufacturing). It should be understood that many other applications for the invention and many other embodiments of the invention will be apparent to those skilled in the art. The following claims should be interpreted as covering all applications and embodiments that fall within the true spirit and scope of the invention.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

The invention claimed is:

1. A display system comprising:
   a display device comprising an array of display pixels, the array comprising at least two-dimensions;
   at least three image memories, each image memory comprising a storage array of at least two dimensions for storing pixel data that reflects a specific display image;
   update circuitry for writing updated pixel data into one of said at least three image memories, whereby said updated pixel data is reflective of an updated display image;
   refresh circuitry for refreshing said display device from the pixel data stored in one of said at least three image memories;
   reset circuitry for clearing the pixel data stored in one of said at least three image memories, wherein said reset circuitry allows a first time period over which an image memory is cleared to overlap with a second time period over which a different image memory is updated; and
   control circuitry for periodically interchanging functions of said at least three image memories wherein the image memory that was most recently updated is used to refresh said display device and wherein an image memory that was previously used to refresh said display device is cleared and wherein updated pixel data is written into an image memory that was previously cleared.

2. The invention of claim 1 wherein said at least three image memories comprises three image memories.

3. The invention of claim 2 wherein each of said three image memories comprises a unique physical memory circuit.

4. The invention of claim 2 wherein said three image memories comprise a single physical memory circuit and wherein each of said three image memories comprises a unique contiguous portion of said single physical memory circuit.

5. A display system comprising:
   a display device comprising a two-dimensional array of display pixels, at least three image memories, each image memory comprising a two-dimensional array of memory locations for storing pixel data that reflects a specific display image;
   update circuitry for writing updated pixel data into one of said at least three image memories, whereby said updated pixel data is reflective of an updated display image;
   refresh circuitry for refreshing said display device from the pixel data stored in one of said at least three image memories;
   reset circuitry for clearing the pixel data stored in one of said at least three image memories, wherein said reset circuitry allows a first time period over which an image memory is cleared to overlap with a second time period over which a different image memory is updated; and
   control circuitry for periodically interchanging functions of said at least three image memories wherein the image memory that was most recently updated is used to refresh said display device and wherein an image memory that was previously used to refresh said display device is cleared and wherein updated pixel data is written into an image memory that was previously cleared.

6. The invention of claim 5 wherein said at least three image memories comprises three image memories.

7. The invention of claim 6 wherein each of said three image memories comprises a unique physical memory circuit.

8. The invention of claim 6 wherein said three image memories comprise a single physical memory circuit and wherein each of said three image memories comprises a unique contiguous portion of said single physical memory circuit.

9. A display system comprising:
   a display device comprising a two-dimensional array of display pixels, three image memories, each image memory comprising a two-dimensional array of memory locations for storing pixel data that reflects a specific display image;
   update circuitry for writing updated pixel data into one of said three image memories, whereby said updated pixel data is reflective of an updated display image;
   refresh circuitry for refreshing said display device from the pixel data stored in one of said three image memories;
   reset circuitry for clearing the pixel data stored in one of said three image memories, wherein said reset circuitry allows the time period over which an image memory is cleared to overlap with the time period over which a different image memory is updated; and
   control circuitry for periodically interchanging functions of said three image memories wherein the image memory that was most recently updated is used to refresh said display device and wherein the image memory that was most recently used to refresh said display device is cleared and wherein updated pixel data is written into the image memory that was most recently cleared.

10. The invention of claim 9 wherein each of said at least three image memories comprises a unique physical memory circuit.

11. The invention of claim 9 wherein each of said at least three image memories comprise a unique contiguous portion of a larger physical memory circuit.

* * * * *